(12) United States Patent
Tscherwitschke et al.

(10) Patent No.: US 9,187,033 B2
(45) Date of Patent: Nov. 17, 2015

(54) PASSENGER SEAT

(75) Inventors: Timo Tscherwitschke, Deutschland (DE); Peter Gall, Deutschland (DE)

(73) Assignee: RECARO Aircraft Seating GmbH & Co. KG, Schwäbisch Hall (DE)

( * ) Notice: Subject to any disclaimer, the term of this patent is extended or adjusted under 35 U.S.C. 154(b) by 351 days.

(21) Appl. No.: 13/816,869

(22) PCT Filed: Aug. 19, 2011

(86) PCT No.: PCT/EP2011/004181
§ 371 (c)(1),
(2), (4) Date: Jul. 1, 2013

(87) PCT Pub. No.: WO2012/025212
PCT Pub. Date: Mar. 1, 2012

(65) Prior Publication Data
US 2013/0285422 A1    Oct. 31, 2013

(30) Foreign Application Priority Data

Aug. 25, 2010 (DE) .......................... 10 2010 035 415

(51) Int. Cl.
*B64D 11/06* (2006.01)
*B60Q 3/00* (2006.01)
(Continued)

(52) U.S. Cl.
CPC ............... *B60Q 3/002* (2013.01); *B60N 2/242* (2013.01); *B60N 3/002* (2013.01); *B64D 11/06* (2013.01); *B64D 11/0624* (2014.12); *B64D 11/0646* (2014.12); *B64D 2045/007* (2013.01)

(58) Field of Classification Search
CPC ........ A47C 7/725; A47C 1/13; B60Q 3/0223; B60Q 3/002

USPC ................. 297/217.6; 362/131, 470, 511, 488
See application file for complete search history.

(56) References Cited

U.S. PATENT DOCUMENTS 2,865,438 A * 12/1958 Machielse et al. .......... 297/217.6
4,202,030 A * 5/1980 Kimura ........................ 362/489
(Continued)

FOREIGN PATENT DOCUMENTS

CH              663764 A5      1/1988
DE           3219710 A1     12/1983
(Continued)

OTHER PUBLICATIONS

German Search Report issued from the German Patent Office dated Jun. 17, 2011 for the corresponding DE patent application No. 10 2010 035 415.5.
(Continued)

*Primary Examiner* — Sarah B McPartlin
(74) *Attorney, Agent, or Firm* — Posz Law Group, PLC

(57) ABSTRACT

A passenger seat includes a first seat element and at least one second seat chamber element that are movable relative to each other, and which can be stood on a base of a transport means and has at least one optical transmission unit having a light input element, at least one light output element and at least one light guide path that runs from the light input element to the light output element and along which light is conducted. The optical transmission unit is provided for contact-free transmission of light in at least one operating state at at least one location of the light guide path that differs from a location of a light input into the light input element and from a location of light output from the light output element.

19 Claims, 4 Drawing Sheets

(51) Int. Cl.
B60N 2/24 (2006.01)
B60N 3/00 (2006.01)
B64D 45/00 (2006.01)

(56) References Cited

U.S. PATENT DOCUMENTS

| | | | |
|---|---|---|---|
| 4,519,670 A * | 5/1985 | Spinner et al. | 385/25 |
| 5,984,415 A | 11/1999 | Schumacher | |
| 6,168,302 B1 * | 1/2001 | Hulse | 362/511 |
| 6,353,394 B1 | 3/2002 | Mori | |
| 6,419,379 B1 * | 7/2002 | Hulse | 362/488 |
| 8,113,579 B2 * | 2/2012 | Fiore et al. | 297/217.6 |
| 2002/0102058 A1 * | 8/2002 | Hulse | 385/45 |
| 2004/0195875 A1 | 10/2004 | Skelly | |

FOREIGN PATENT DOCUMENTS

| | | |
|---|---|---|
| DE | 10045689 A1 | 9/1999 |
| EP | 0763466 B1 | 7/1996 |
| EP | 0941168 B1 | 9/1998 |
| FR | 2935653 A1 | 3/2010 |
| WO | 99/16638 A1 | 4/1999 |

OTHER PUBLICATIONS

International Search Report issued from the PCT Patent Office dated Aug. 19, 2011 for the corresponding PCT/EP2011/004181 (with English translation).

Written Opinion issued from the PCT Patent Office dated Aug. 19, 2011 for the corresponding PCT/EP2011/004181.

International Preliminary Report on Patentability and Written Opinion of the International Searching Authority mailed Mar. 7, 2013 (English translation only).

EP Office Action dated May 21, 2015 in the corresponding EP patent application 11 754 933.1 (Partial english translation attached).

* cited by examiner

PASSENGER SEAT

CROSS REFERENCE TO RELATED APPLICATION

This application is a U.S. national stage application of PCT/EP2011/004181 filed on Aug. 19, 2011, and claims priority to, and incorporates by reference German Patent Application No. 10 2010 035 415.5 filed on Aug. 25, 2010.

BACKGROUND

The invention is based on a passenger seat which has a first seat element and at least a second seat element which are movable relative to one another, and which passenger seat can be stood on a floor of a means of transportation and has at least one optical transmission unit.

Such a passenger seat which has a transmission unit for transmitting light from the first seat element to the second seat element is already known.

SUMMARY

The invention is based on the object of making available a passenger seat of a generic type by means of which the reliability of the transmission of light between seat elements can be increased.

This object is achieved by means of a passenger seat as discussed below.

The invention is based on a passenger seat which has a first seat element and at least a second seat element which are movable relative to one another, and which passenger seat can be stood on a floor of a means of transportation. The seat elements can be embodied, for example, as a seat bottom on which a passenger sits, as the backrest which supports the back part of the passenger, as a seat housing element or as an armrest. The passenger seat can also have further seat elements which are known to a person skilled in the art.

The first seat element and the second seat element are movable relative to one another in a normal operating mode of the passenger seat. However, in principle, in the normal operating mode of the passenger seat said first seat element and second seat element can also be arranged fixedly relative to one another and be movable relative to one another only in at least one other operating mode of the passenger seat which is different from the normal operating mode. Such an operating mode which is different from the normal operating made may be, for example, a maintenance mode of the passenger seat.

It is proposed that the passenger seat has at least one optical transmission unit having a light input element, at least one light output element and at least one light guide path which runs from the light input element to the light output element and along which light is guided, wherein the optical transmission unit is provided for transmitting light in a contactless fashion in at least one operating state, at at least one location of the light guide path which differs from a location of a light input into the light input element and from a location of a light output from the light output element. A "light input element" is to be understood in this context as meaning, in particular, an element of the optical transmission unit, at which light which is generated by a light source enters the light guide path. "Contactless transmission of light" is to be understood in this context as meaning, in particular, that the light guide path has at least one region in which, apart from the air which is present on all sides, no other material, in particular no solid, is arranged.

In a corresponding configuration, a solution for transmission of light can be made available which, in one region of the light guide path, avoids the known use of electric cables and light-guiding fibers and as a result avoids stressing the electric cables and light-guiding fibers under torsion and/or bending in the case of a relative movement of seat elements, as a result of which material fatigue fractures are advantageously prevented and the operational reliability of the transmission of light in the passenger seat can be increased.

In the previously described case in which the first and the second seat element are arranged fixedly relative to one another in the normal operating mode of the passenger seat, but are movable relative to one another in the maintenance mode of the passenger seat, it is possible, in a corresponding configuration, for a maintenance procedure to be advantageously simplified since disconnection of an electric cable or a light-guiding fiber can be avoided and/or necessary adjustment of a relative position between the first seat element and the second seat element can be carried out more easily.

The optical transmission unit can advantageously comprise a light emission unit, which is provided for emitting light, and a light-collecting unit which is provided for at least partially collecting the light emitted by the light emission in at least one operating state, as a result of which a simple arrangement for contactless transmission of light can be achieved.

In one advantageous configuration it is proposed that the light emission unit of the optical transmission unit is arranged at the first seat element, and the light-collecting unit of the optical transmission unit is arranged at the second seat element which is movable relative to the first seat element. As a result, a particularly simple solution for the transmission of light with simultaneous avoidance of mechanical stress of electrical cables and light-guiding fibers under torsion and/or bending in the case of relative movement of the seat elements can be achieved.

In addition it is proposed that the contactless transmission of the light from the first seat element to the second seat element which is different therefrom and is movable relative to the first seat element takes place in discrete regions, delineated from one another, of a relative position of the first seat element and of the second seat element. The "discrete regions, delineated from one another, of a relative position" is to be understood in this context as meaning, in particular, that a movement range of the second seat element relative to the first seat element is divided into a finite number of coherent regions, wherein regions with the transmission of light and regions without the transmission of light alternate with one another during a continuous movement of the second seat element from an initial position to an end position. As a result, in a corresponding configuration a display of a relative arrangement between the seat elements can be advantageously achieved.

In addition it is proposed that the light guide path be formed at least partially by at least one optical waveguide. An "optical waveguide" is to be understood in this context as meaning, in particular, a cylindrical body made of a translucent material whose optical index of refraction is greater than the optical index of refraction of a material which directly surrounds the cylindrical body. A "cylindrical body" is to be understood in this context as meaning, in particular, a body shape which arises as a result of displacement of a planar surface or curve along a straight line which does not lie in this plane. As a result, a particularly flexible way of guiding light can be achieved. Optical waveguides can preferably be manufactured from glass and/or transparent plastic.

In a known fashion, it is also possible to use bundles of optical waveguides which have an advantageously large optical aperture through which the light can be easily input into the optical waveguide and output therefrom.

Furthermore what is proposed is that the optical transmission unit have at least one collimator unit. A "collimator unit" is to be understood in this context as meaning, in particular, a unit made of optical elements, which unit is provided for generating a parallel light beam from an essentially punctiform light source. As a result, widening of the beam of light in a direction perpendicular to the light guide path can be achieved, as a result of which component tolerances and adjustment parameters are advantageously compensated and guiding of light is simplified.

Furthermore it is proposed that the light, output element be formed by a beam-widening element. A "beam-widening element" is to be understood in this context as meaning, in particular, an optical element with an optical axis, which element brings about divergence of the light beam in the case of an axis-parallel incident light beam in such a way that said light beam diverges from the optical axis. As a result, good visibility of light signals can be achieved, in particular in a lateral view of the light output element.

In a further advantageous configuration, the first seat element is formed by a seat housing element which is fixedly arranged relative to the floor of the means of transportation. In a corresponding configuration, reliable and cost-effective supply of a passenger seat or of a plurality of passenger seats with light from an external light source can therefore be achieved.

If in at least one operating state the contactless transmission of the light takes place between the seat housing element which is fixedly arranged relative to the floor of the means of transportation and a seat element which is movable relative thereto, given a corresponding configuration reliable and cost-effective inputting of light, for example for reading purposes or for displaying information, from a central light supply, permanently installed in the means of transportation, can also be made possible simultaneously in a plurality of passenger seats arranged one next to the other.

If the first seat element is formed by a seat bottom and the second seat element is formed by an armrest, a particularly reliable solution for transmitting light into the armrest can be made available. A "seat bottom" is to be understood in this context as meaning, in particular, a seat element of the passenger seat which supports the passenger in a seating position and which is usually equipped with fitted-on upholstery. In particular, light signals such as an "in-use light", which a status of use of an additional device of the passenger seat, such as, for example, a voltage supply for a PC (Personal Computer) or for entertainment electronics (In Flight-Entertainment, IFE) can advantageously be transmitted from the first seat element, which is embodied, for example, as a seat bottom or as an element of a seat structure, into an armrest which is movable relative to the first seat element, where the light signals can be displayed in a way which can easily be displayed in a controlled manner by members of an on-board personnel team. Installation of an electric cable or of an optical waveguide formed by a light-guiding flexible fiber between the first seat element, and the movable armrest can be dispensed with, as a result of which the operational reliability of the signal display can be increased.

Further advantages are apparent from the following description of the drawings. Exemplary embodiments of the invention are illustrated in the drawings. The following description contains numerous features in combination. A person skilled in the art will also expediently consider the features individually and combine them to form further appropriate combinations.

BRIEF DESCRIPTION OF THE DRAWINGS

Further advantages are apparent from the following description of the drawings. Exemplary embodiments of the invention are illustrated in the drawings. The description and the claims contain numerous features in combination. A person skilled in the art will also expediently consider the features individually and combine them to form further appropriate combinations.

DETAILED DESCRIPTION

Figure 1:
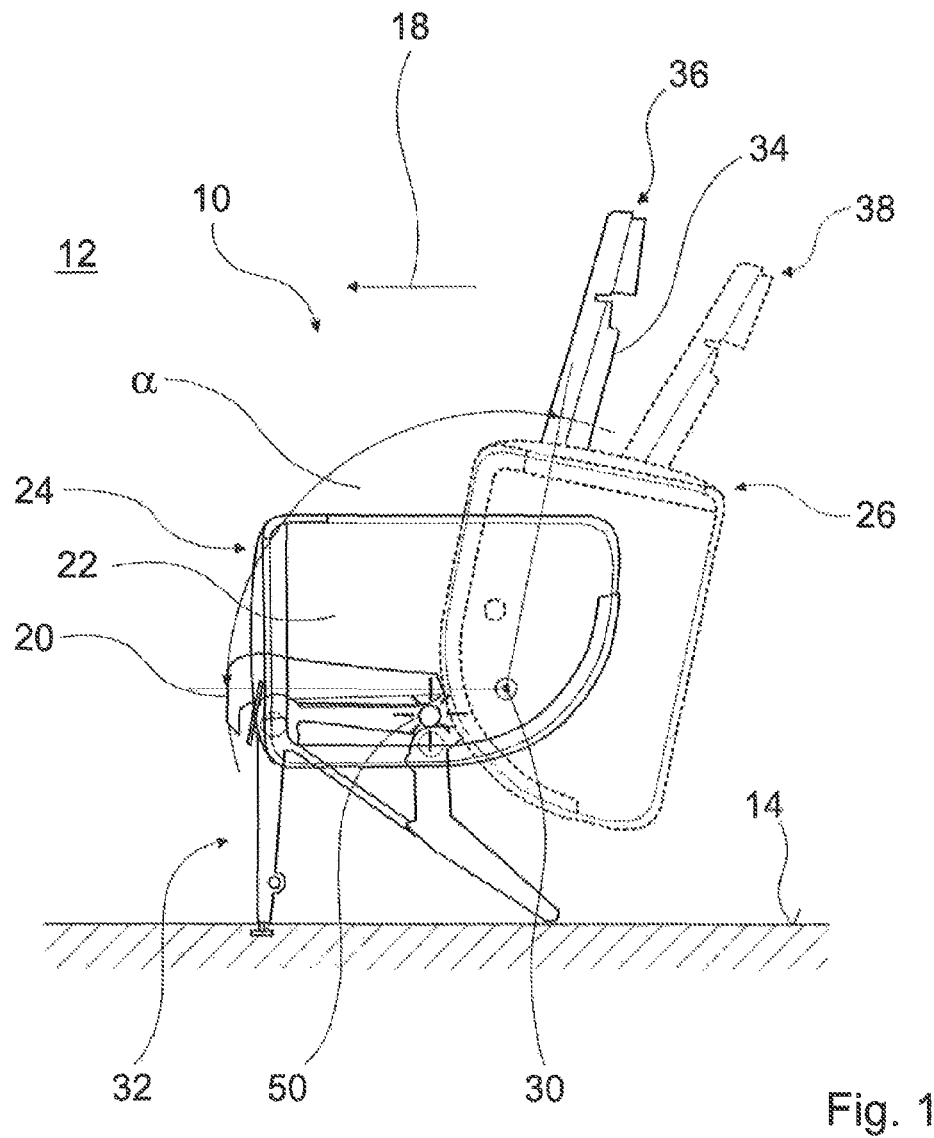
FIG. 1 is a schematic view of a passenger seat, embodied as a passenger seat in an aircraft, in an installed state.

FIG. 1 shows, in a schematic illustration in a side view, a passenger seat, embodied as a passenger seat 10 in an aircraft, in an installed state, in an interior space 12 of a means of transportation (not illustrated in more detail) embodied as an aircraft. However, in other embodiments the passenger seat can also be utilized in other means of transportation, specifically, for example, in a railway car, a coach or a passenger ship.

The passenger seat 10 in an aircraft has a plurality of seat elements 20, 22, 32, 34. A first seat element 20 which is embodied as a seat bottom is arranged above a third seat element 32 which is embodied as a seat structure and with which the passenger seat 10 in an aircraft is stood on a floor 14 of the interior space 12 of the aircraft. A second seat element 22 of the passenger seat 10 in an aircraft is embodied as an armrest which is movable relative to the seat bottom. The armrest is movable between a position of use 24 and a release position 26 by pivoting about an armrest axis 30 in order to provide easier access to the passenger seat 10 in an aircraft for passengers with limited mobility. Both the position of use 24 and the release position 26 constitute end positions of a pivoting movement of the armrest about the armrest axis 30. The passenger seat 10 in an aircraft has a sitting direction 18 which corresponds to a transportation direction or direction of flight in the example considered. The armrest axis 30 is arranged perpendicularly with respect to the sitting direction 18 and parallel to the floor 14 of the interior space 12 of the aircraft.

At a rear end, viewed in the sitting direction 18, of the first seat element 20 which is embodied as a seat bottom, a further seat element 34, formed by a backrest, is arranged, said further seat element 34 being pivotable between a sitting position 36, arranged essentially perpendicularly with the floor 14 of the interior space 12 of the aircraft, and a comfort position 38 which is inclined with respect to the floor of the interior space 12 of the aircraft.

Figure 2:
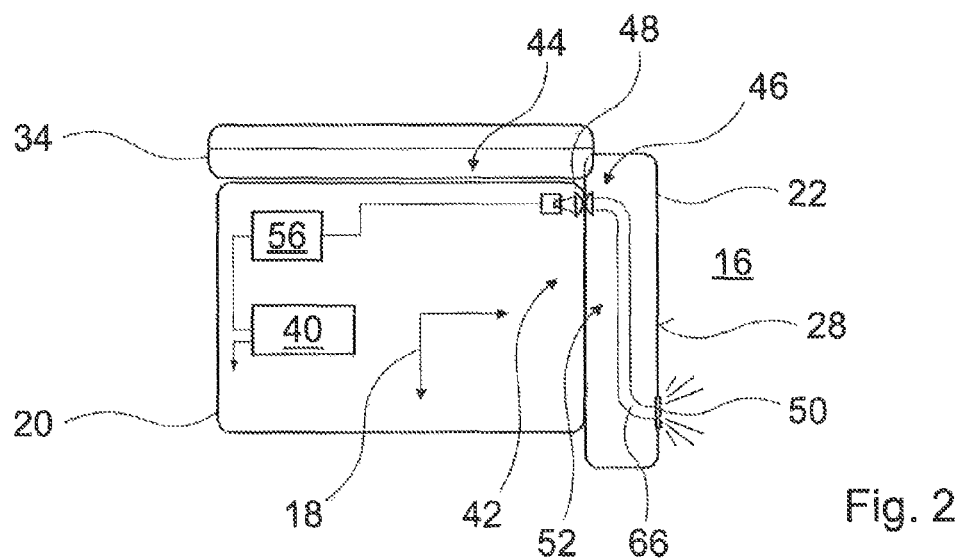
FIG. 2 is a detail view of the passenger seat according to FIG. 1 in a plan view.

FIG. 2 shows a detail view of the passenger seat 10 in an aircraft in a plan view. The passenger seat 10 in an aircraft is arranged in an aisle 16 of the interior space of the aircraft.

FIG. 2 shows the armrest facing the aisle 16, said armrest covering the seat bottom transversely with respect to the sitting direction 18 towards the aisle 16. The passenger seat 10 in an aircraft comprises in a known fashion a voltage supply unit 40 (which is not illustrated in more detail) which is provided for supplying a laptop computer of a passenger with an operating voltage. In order to permit the passenger to monitor use of the voltage supply unit 40 by the laptop computer, the passenger seat 10 in an aircraft has a light output element 50 ("in-use light") which is arranged as a beam-widening element in the form of a concave Fresnel lens made of transparent plastic on an aisle-side outer face 28 of the armrest.

In order to supply the light output element 50 with light, the passenger seat 10 in an aircraft has an optical transmission unit 42 which comprises a light emission unit 44 which is arranged at the first seat element 20 formed by the seat bottom, a light-collecting unit 46 which is arranged at the second seat element 22 formed by the armrest, and a light guide path 52 which runs from a first light input element 48 (FIG. 3) of the optical transmission unit 42 to the light output element 50 of the optical transmission unit 42 and along which the light is guided.

Figure 3:
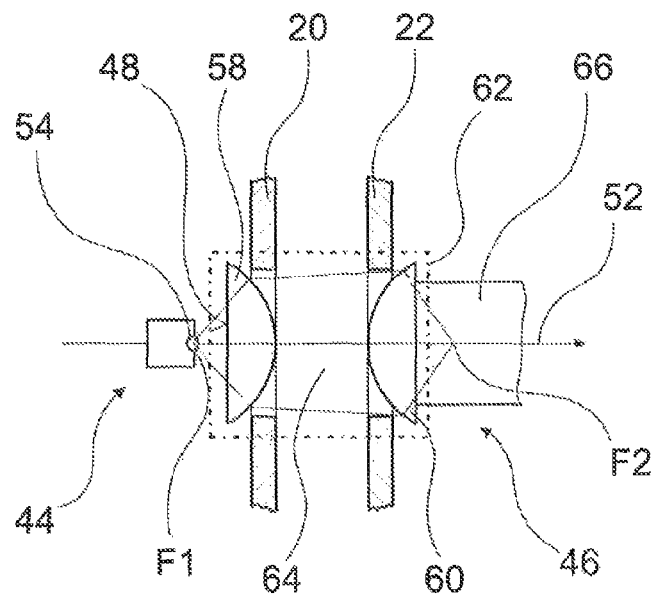
FIG. 3 is a detailed view of the optical transmission unit having a collimator unit.

The light emission unit 44 has a light source formed by a light emitting diode 54 and an actuation unit 56 (not illustrated in more detail) which is provided for supplying the light emitting diode 54 with an operating voltage as a function of the use of the voltage supply unit 40. The light emitting diode 54 is arranged at the focal point F1 of a first plano-convex optical collecting lens 58 which serves as a light input element 48 of the optical transmission unit 42 and is part of a collimator unit 62 of the optical transmission unit 42 (FIG. 3). Light which is generated by the light emitting diode 54 is partially collected in a known fashion by the plano-convex first optical collecting lens 58 and converted into an approximately axis-parallel light beam 64.

If the armrest is arranged in the position of use 24, the approximately axis-parallel light beam 64 impacts, in the further course of the light, guide path 52, on the light-collecting unit 46 which is arranged in the armrest. Firstly, the approximately axis-parallel light beam 64 is incident on a further plano-convex optical collecting lens 60 of the collimator unit 62 of the optical transmission unit 42. As a result, the approximately axis-parallel light beam 64 is bundled at a focal point F2 of the further plano-convex optical collecting unit 60 and is transmitted into an optical waveguide 66 of the light-collecting unit 46 which forms part of the further light guide path 52 subsequent to the further plano-convex optical collecting lens 60. An end of the optical waveguide 66 which is remote from the light emitting diode 54 is connected to the light output element 50 of the optical transmission unit 42 at the aisle-side outer face 28 of the armrest, with the result that the light at the light output element 50 of the optical transmission unit 42 exits the passenger seat 10 in an aircraft (FIG. 2). The optical waveguide 66 is embodied in a flexible fashion, as a result of which particularly good displaceability and a large degree of freedom of design in the selection of a location for the light output element 50 on the aisle-side outer face 28 of the armrest can be achieved. Basically, the optical waveguide 66 can, however, also be of rigid design by virtue of the fact that, for example, the light output element 50 and the further plano-convex optical collecting lens 60 are aligned in a direction which is oriented perpendicularly with respect to the sitting direction 18 and parallel to the floor 14 of the interior space 12 of the aircraft.

In an operating state which corresponds to an arrangement of the armrest in the position of use 24 and to simultaneous use of the voltage supply unit 40 by the passenger, the optical transmission unit 42 is provided for transmitting light in a contactless fashion at a location of the light guide path 52 between the first plano-convex optical collecting lens 58 of the collimator unit 62 and the second plano-convex optical collecting lens 60 of the light-collecting unit 46. This location of the light guide path 52 differs from a location of the light input into the light input element 48 of the optical transmission unit 42 and also from a location of the light output from the light output element 50 of the optical transmission unit 42.

If the armrest is pivoted out of the position of use 24 through an angle $\alpha_{max}$ as far as the release position 26, part of a light intensity I arrives in a known fashion at the light output element 50 of the optical transmission unit 42 as a function of a pivoting angle $\alpha$ and geometric relationships within the collimator unit 62. Starting from a limiting pivoting angle $\alpha_s$ of the armrest, no part of the approximately axis-parallel light beam 64 is instant on the light-collecting unit 46 any more, and light no longer exits the light output element 50 of the optical transmission unit 42 (FIG. 4).

Figure 4:
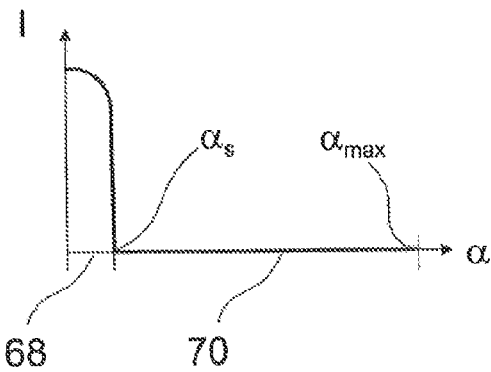
FIG. 4 is a schematic view of the dependence of light, emerging from a light output element, on a pivoting angle of an armrest of the passenger seat according to FIG. 1.
Figure 5:
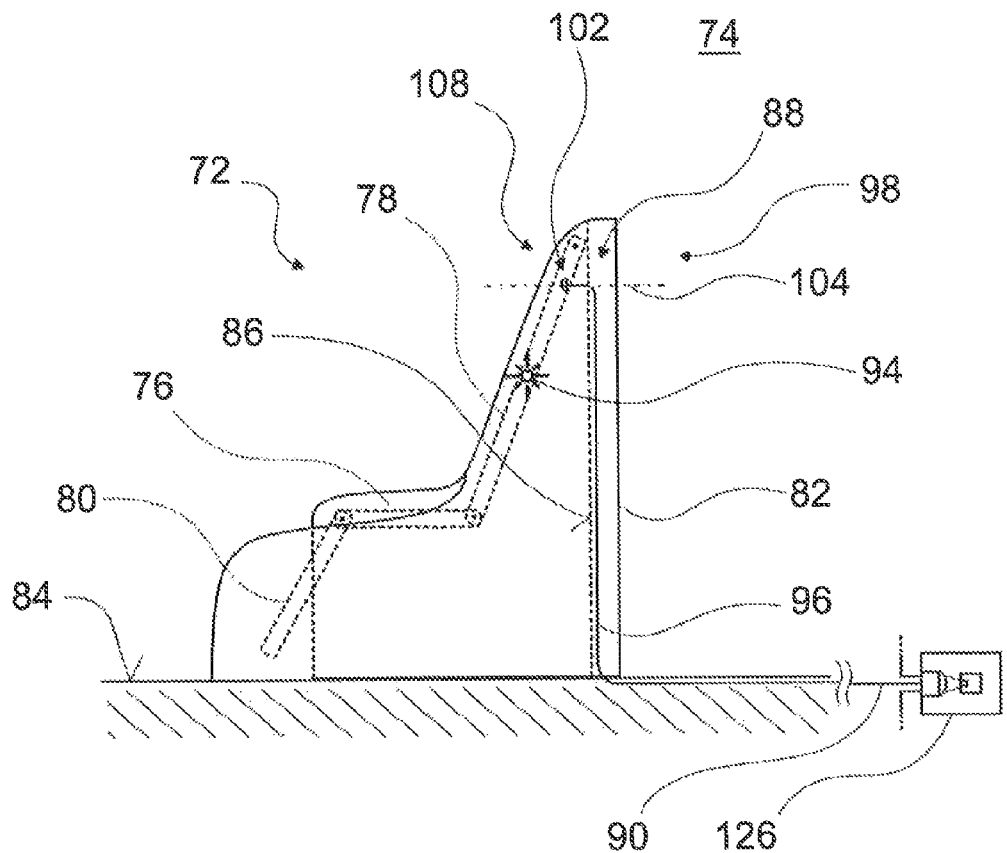
FIG. 5 is a schematic view of a further passenger seat, embodied as a passenger seat in an aircraft, in a normal position.
Figure 6:
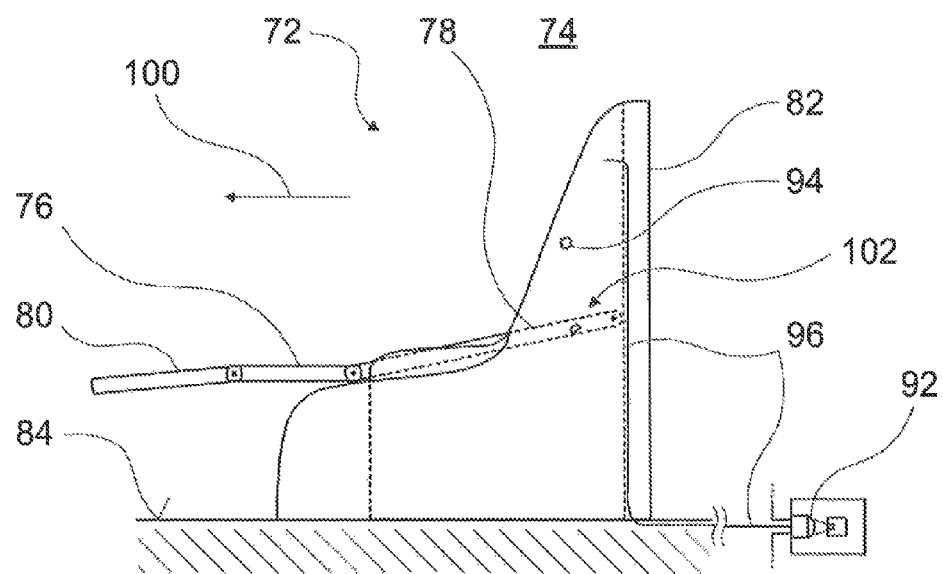
FIG. 6 is a schematic view of the passenger seat according to FIG. 5 in a comfort position and lying position.
Figure 7:
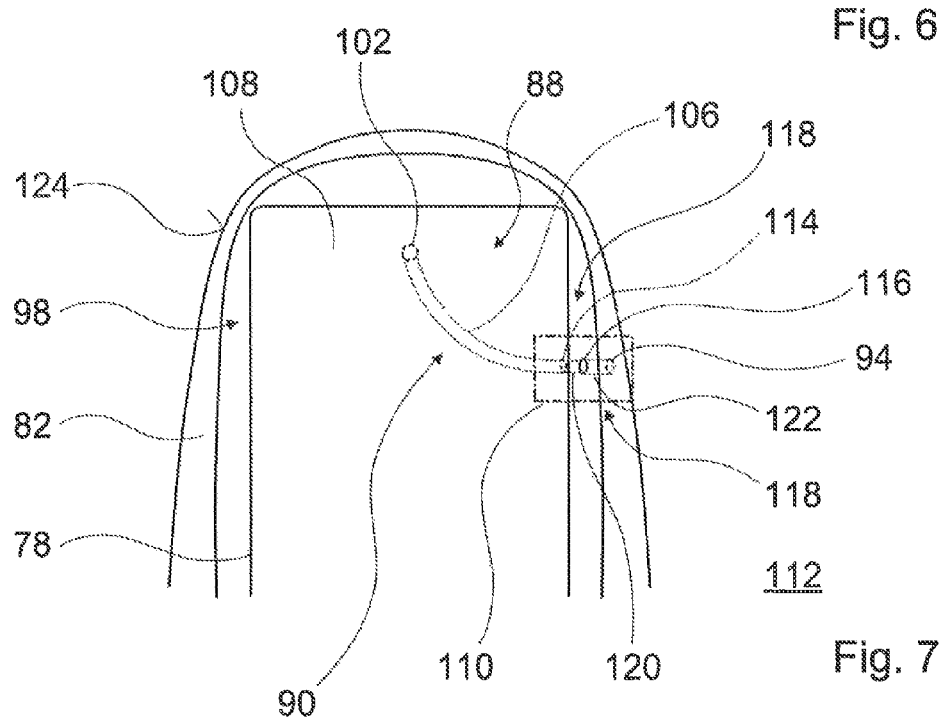
FIG. 7 is a schematic view of the passenger seat according to FIG. 5 in a front view.

The contactless transmission of the light from the first seat element 20, embodied as a seat bottom, to the second seat element 22, which is different therefrom, and is embodied as an armrest and is movable relative to the seat bottom, occurs accordingly in two discrete regions 68, 70, delineated from one another, of the pivoting angle $\alpha$ of the armrest, which pivoting angle $\alpha$ denotes a relative position of the seat bottom and of the armrest (FIG. 4). In particular, the contactless transmission of the light takes place in a region of one of the two end positions of the armrest. FIGS. 5, 6 and 7 show, as an alternative exemplary embodiment in a highly schematic illustration in a side view, a passenger seat which is embodied as a first class passenger seat 72 in an aircraft, in an installed state in an interior space 74 of a means of transportation (not illustrated in more detail) embodied as an aircraft. The passenger seat 72 in an aircraft comprises a plurality of seat elements 76, 78, 80 which are each embodied as a seat bottom, backrest and leg rest and are movable in a known fashion relative to one another between a normal position of the passenger seat 72 in an aircraft according to FIG. 5 and a comfort position and lying position of the passenger seat 72 in an aircraft according to FIG. 6 by means of a mechanical adjustment device which is known per se and which is not illustrated for reasons of clarity. The adjustment device also serves to stand the passenger seat 72 in an aircraft on a floor 84 of the interior space 74 of the aircraft.

The passenger seat 72 in an aircraft also has a seat housing element 82 which is fixedly arranged relative to the floor 84 of the interior space 74 of the aircraft and into which an armrest of the passenger seat 72 in an aircraft is integrated. FIG. 5 illustrates the armrest facing an aisle 112 of the interior space 74. During a movement of the passenger seat 72 in an aircraft between the normal position and the comfort position and lying position, the backrest is guided along an inner rear side 86 of the seat housing element 82 via the adjustment device with a headrest region 108.

Safety guidelines require the passenger seat 72 in an aircraft to be set to the normal position during certain transportation situations (taxi, take-off, landing). Corresponding checking via the flight personnel is a customary component of relevant procedures. In order to simplify the checking, the passenger seat 72 in an aircraft has an optical transmission unit 88 whose function will be described below.

The optical transmission unit 88 comprises a light source 126 which is provided for simultaneously making available light from a plurality of optical transmission units in adjacent aircraft passenger seats of a row of aircraft passenger seats.

For reasons of clarity, this arrangement which is familiar to a person skilled in the art is not illustrated in more detail. The light is coupled into a light guide path 90 of the optical transmission unit 88 at a light input element 92 embodied as a collecting lens (FIG. 6). On a side of the collecting lens facing away from the light source 126, a further part of the light guide path 90 is formed by an optical waveguide 96 which, in a partial region, is fixedly installed in the floor 84 of the interior space 74 of the aircraft and is routed as far as the passenger seat 72 in an aircraft. This part of the optical waveguide 96 is not illustrated in more detail. The optical waveguide 96 is also permanently installed along the inner rear side 86 of the seat housing element 82, ends in an upper region 98 of the seat housing element 82, and on this side is oriented parallel to a sitting direction 100 which corresponds to a transportation direction or a flying direction in the example considered. The optical waveguide 96 therefore forms a light emission unit of the optical transmission unit 88 which is arranged on the seat element which is embodied as a seat housing element 82. In the headrest region 108 of the backrest, the passenger seat 72 in an aircraft has a light-collecting unit 102 which is formed by a further collecting lens (FIG. 5). In the normal position, the passenger seat 72 in an aircraft, an optical axis 104 of the further collecting lens of the light-collecting unit 102 and an orientation direction of an end of the optical waveguide 96 arranged in the upper region 98 of the seat housing element 82 are largely aligned, with the result that light exits the optical waveguide 96 along the light guide path 90 in the upper region 98 of the seat housing element 82 and can enter the light-collecting unit 102.

In this way, as a result of the optical transmission unit 88, in an operating state of the normal position of the passenger seat 72 in an aircraft, contactless transmission of the light takes place between the seat housing element 82 which is fixedly arranged relative to the floor 84 of the interior space 74 of the aircraft and the seat element 78, which is movable relative thereto and embodied as a backrest, of the passenger seat 72 in an aircraft.

The collecting lens of the light-collecting unit 102 is optically coupled to a flexible optical waveguide 106 which is laid within the backrest from a rear side of the headrest region 108 of the backrest as far as a side region 110, facing the aisle 112, of the backrest (FIG. 7). An end of the optical waveguide 106 which is arranged there is oriented in a direction running perpendicular to the sitting direction 100 and parallel to the floor 84 of the interior space 74 of the aircraft, and is optically coupled to a further collecting lens 114 which is part of a collimator unit 118 whose method of function is identical to the method of functioning of the collimator unit 62 of the first exemplary embodiment, with the result that it is possible to dispense with an explanation in order to avoid repetitions at this point. The further collecting lens 114 converts the light at the end of the optical waveguide 106 into a virtually axis-parallel light beam 120 µm. A further collecting lens 116 is mounted as part of the collimator unit 118 at the inner rear side 86 of the seat housing element 82 in the direction in which that end of the optical waveguide 106 which faces the aisle 112 is oriented in the normal position of the passenger seat 72 in an aircraft. The collecting lens 116 collects part of the virtually axis-parallel light beam 120 and inputs this part into a rigidly embodied optical waveguide 122 which is guided by the collecting lens 116 as far as an outer side, facing the aisle 112, of the seat housing element 82. At one location of a light output, a light output element 94, which is formed by a concave Fresnel lens made of plastic, is integrated into an outer surface 124 of the seat housing element 82. In the normal position of the passenger seat 72 in an aircraft, light emerges from the Fresnel lens, with the result that rapid and reliable checking of the normal position of the passenger seat 72 in an aircraft is made possible by the flight personnel.

In this exemplary embodiment, accordingly at two locations of the light guide path 90 between the light input element 92 and the light output element 94, which differ from the location of the light input into the light input element 92 and from the location of the light output from the light output element 94, light is transmitted in a contactless fashion by the optical transmission unit 88 in a normal position of the passenger seat 72 in an aircraft, between the seat element 78 embodied as a backrest and the seat housing element 82 of the passenger seat 72 in an aircraft, these being movable relative to one another.

The contactless transmission of the light additionally takes place in two discrete regions, delineated from one another, of a relative position of the backrest and the seat housing element 82, and corresponds to the profile according to FIG. 4 if, instead of the pivoting angle α, a perpendicular movement path of the headrest region 108 of the backrest from the normal position is used as a parameter of a display.

The invention claimed is:

1. A passenger seat which comprises:
   a first seat element and at least a second seat element which are movable relative to one another, and which passenger seat can be stood on a floor of a means of transportation,
   at least one optical transmission unit having a light input element,
   at least one light output element, and
   at least one light guide path which runs from the light input element to the light output element and along which light is guided,
   wherein the optical transmission unit is provided for transmitting light in a contactless fashion in at least one operating state, at at least one location of the light guide path which differs from a location of a light input into the light input element and from a location of a light output from the light output element, and
   wherein the optical transmission unit has a light emission unit which is arranged at the first seat element, and a light-collecting unit which is arranged at the second seat element which is movable relative to the first seat element.

2. The passenger seat as claimed in claim 1, wherein the contactless transmission of the light from the first seat element to the second seat element which is different therefrom and is movable relative to the first seat element takes place in discrete regions, delineated from one another, of a relative position of the first seat element and of the second seat element.

3. The passenger seat as claimed in claim 1, wherein the light guide path is formed at least partially by at least one optical waveguide.

4. The passenger seat as claimed in claim 1, wherein the optical transmission unit has at least one collimator unit.

5. The passenger seat as claimed in claim 1, wherein the light output element is formed by a beam-widening element.

6. The passenger seat as claimed in claim 1, wherein the first seat element is formed by a seat housing element which is fixedly arranged relative to the floor of the means of transportation.

7. The passenger seat as claimed in claim 6, wherein in at least one operating state the contactless transmission of the light takes place between the seat housing element which is fixedly arranged relative to the floor of the means of transportation and a seat element which is movable relative thereto.

8. The passenger seat as claimed in claim 1, wherein the first seat element is formed by a seat bottom and the second seat element is formed by an armrest.

9. The passenger seat as claimed in claim 8, wherein the contactless transmission of light occurs at least in a region of an end position of the armrest.

10. The passenger seat as claimed in claim 1, wherein the contactless transmission of the light from the first seat element to the second seat element which is different therefrom and is movable relative to the first seat element takes place in discrete regions, delineated from one another, of a relative position of the first seat element and of the second seat element.

11. The passenger seat as claimed in claim 1, wherein the light guide path is formed at least partially by at least one optical waveguide.

12. The passenger seat as claimed in claim 1, wherein the optical transmission unit has at least one collimator unit.

13. The passenger seat as claimed in claim 1, wherein the light output element is formed by a beam-widening element.

14. The passenger seat as claimed in claim 2, wherein the light guide path is formed at least partially by at least one optical waveguide.

15. The passenger seat as claimed in claim 2, wherein the optical transmission unit has at least one collimator unit.

16. The passenger seat as claimed in claim 2, wherein the light output element is formed by a beam-widening element.

17. The passenger seat as claimed in claim 3, wherein the optical transmission unit has at least one collimator unit.

18. The passenger seat as claimed in claim 3, wherein the light output element is formed by a beam-widening element.

19. The passenger seat as claimed in claim 4, wherein the light output element is formed by a beam-widening element.

* * * * *